United States Patent [19]

Enkvist

[11] 3,864,291

[45] Feb. 4, 1975

[54] KRAFT OR SODA BLACK LIQUOR ADHESIVE AND PROCEDURE FOR MAKING THE SAME

[76] Inventor: Terje Ulf Eugen Enkvist, Runebergsgatan 30A, Helsinki, Finland

[22] Filed: July 5, 1973

[21] Appl. No.: 376,889

[52] U.S. Cl. ............................... 260/17.5, 156/335
[51] Int. Cl. ............................................ C08g 37/18
[58] Field of Search .................................... 260/17.5

[56] References Cited
UNITED STATES PATENTS

| | | | |
|---|---|---|---|
| 2,501,666 | 3/1950 | Evans | 260/17.5 |
| 2,751,650 | 6/1956 | Froberger | 22/193 |
| 3,090,700 | 5/1963 | Ball et al | 117/66 |
| 3,296,159 | 1/1967 | Lissner | 260/17.5 |
| 3,658,638 | 4/1972 | Ludwig et al | 161/262 |

OTHER PUBLICATIONS

Chem. Abstracts 57, 7489h (1962).

*Primary Examiner*—Morris Liebman
*Assistant Examiner*—E. A. Nielsen
*Attorney, Agent, or Firm*—Biebel, French & Bugg

[57] ABSTRACT

Alkaline, water soluble adhesives based on kraft or soda black liquors from the pulping industry and combined with adhesives made from phenols and formaldehyde, formalin, paraformaldehyde or other formaldehyde containing or developing substances, and intended for glueing e.g. plywood and particle board.

4 Claims, No Drawings

KRAFT OR SODA BLACK LIQUOR ADHESIVE AND PROCEDURE FOR MAKING THE SAME

BACKGROUND OF THE INVENTION

1. Field of the Invention

The invention relates to the field of kraft or soda black liquor adhesives.

2. Description of the Prior Art

For the manufacture of adhesives for plywood, particle board etc. formaldehyde and urea or phenol are at present mostly used as starting materials. These adhesives are rather expensive in proportion to the value of the entire fiber product, especially when this is made from cheap matter such as bark, straw and so forth. In addition, the resistance against moisture of the urea base adhesives is restricted and their acidic nature can in the long run be noxious for the strength of the lignocellulosic matter. Proposals have been made for the use of lignins of various kinds, including kraft lignin, usually as extenders for phenols. These proposals have the disadvantage that big amounts of phenol must be used, generally phenol and lignin in the porportion 1:1, and that the isolation of the kraft or soda lignin from the black liquor is expensive. Original kraft or soda black liquors have not been used for manufacture of adhesives of the phenol-formaldehyde type.

SUMMARY OF THE INVENTION

By now, however, by systematic studies of which factors influence the quality of the glue, it has been shown in the present invention that kraft or soda black liquor can be used for the manufacture of such adhesives, in combination with a rather small proportion of phenol, provided that the right reaction conditions are maintained. A proportion which can be used is, for instance, one part by weight of phenol and 4 parts of organic matter in a kraft or soda black liquor. Adjusting of the pH-value of the adhesive, measured potentiometrically after dilution 1:10 with water, to about 8-10 can be important. At the heating of the kraft black liquor component only small amounts of formaldehyde are necessary. This addition of formaldehyde or formalin, however, suffices for elimination of the bad odor of the liquor.

DESCRIPTION OF THE PREFERRED EMBODIMENTS

At the addition of the common additives to the black liquor adhesives, such as Vavanite, a proprietary name for cocoanut shell powder, calcium carbonate and wheat flour, it can be advantageous to make some deviation from the usual compositions and proportions. Thus the leaving out of the usual addition of quebracho tanning matter can be of considerable advantage.

All these modifications are quite simple and cheap. The manufacture of the water soluble adhesives can be carried out at atmospheric pressure, temperatures below 100° C and digestion times not longer than 3 hours. The possibility to use original kraft or soda black liquor instead of isolated lignin is of great advantage. As such black liquors are alkaline, it will be unnecessary to add any extra alkali to the black liquor component. Operations such as acidification, filtration and new addition of alkali do not need to be performed. The cooking of the adhesive from black liquor will be cheaper than the corresponding manufacture of adhesives from phenol also because temperatures of about 70° only need to be used. It has been found that also a black liquor slightly oxidized with air (example 9) can be used for the manufacture of the adhesives. Thus it is scarcely necessary to use any blanket of inert gas at the manufacture of the adhesives. The viscosity of the black liquor adhesive solutions increases only slowly at storing at room temperature.

As black liquors from the soda process are alkaline as well as kraft black liquors, and contain essentially similar alkali lignins and products of alkaline degradation of wood as kraft black liquors, it is obvious that black liquors from the so-called soda process, where sodium hydroxide is the active reagent, also can be used as starting materials in the present invention in a way similar to that applied for kraft black liquors.

The cheapness of the black liquor adhesive opens new possibilities for glueing of inexpensive products such as bark, needles, straw, bagasse and other waste products. A skilled expert can easily realize that there, in addition to these materials, exists a whole series of further fiber products and other materials which could be advantageously glued with adhesives from kraft or soda black liquors, as well as that the adjusting of the pH of the adhesive to the weakly alkaline area can be performed in several different ways. It can be made with, for instance, sulfuric, acetic or lactic acid, but, of course, many other acidic or acid forming substances can be used. What will be resorted to will to a great extent depend on what can be most easily and cheaply obtained at the place of manufacture. Possible materials are acidic condensates from the evaporation of sulfite spent liquors or other acidic waste liquors from common or high yield pulping processes or from dry distillation of wood, dilute or concentrated crude sulfuric acid obtained by oxidation of sulfur dioxide in stack gases by use of catalysts as, for instance, vanadium oxides or active carbon, and further cation exchangers of different kinds. Also wood chips or sawdust could possibly be used, which particularly at heating in alkaline solutions give off acetic acid and other organic acids. A special group of acidifiers are the so-called latent hardeners, to which belong substances such as esters, including alkyl halides, carbonates or sulfates, and further anhydrides and lactones, which form salts of various acids at heating in alkaline solutions.

At the adjustment of pH some parts of the adhesive can be precipitated as a finer or more coarse sludge or form a colloid solution. Also here those skilled in the art can easily realize that there are many possibilities for variation. For instance the use of the above-mentioned latent hardeners or of emulgators or of restricted amounts of organic solvents can be of advantage.

Another type of possibilities for variation is the choice between separate and joint digestion, as shown by comparison between the examples 3 and 7-9 with the examples 1,2 and 4-6. Further possibilities are the use of black liquors from softwood or hardwood, digested to various values of pH. Obvious possibilities for variations are digestions of the phenolic as well as the black liquor adhesives to various viscosities and the use of various additives or hardeners, especially for glueing of plywood, but also for particle boards. Examples of such additives or hardeners are chalk powder (calcium carbonate), wood meal, Vavanite powder, quebracho extractives and paraformaldehyde. As seen by the examples 7 and 8 it can be of advantage to leave out some component, in this case the quebracho.

The phenolic component in the phenoplastic adhesive does not necessarily need to be common phenol $C_6H_5OH$, but can also be some other phenol with capacity to react with formaldehyde, as for instance cresols, other alkyl phenols or mixtures of them.

The invention is hereinafter described more in detail in the following examples:

EXAMPLE 1

Black liquor adhesive: To 250.4 g of black liquor from kraft digestion of a softwood mixture containing two-thirds of Scotch pine (Pinus sylvestris L.) and one-third of spruce (Picea abies L.), of dry content 51.2% and a content of organic substance, determined according to the analysis method 58:64 of the Central laboratory of Helsinki, Finland (CCA 23:48) 38.2% and density 1.33, 39.4 ml of 35% formalin were added. The mixture was heated 3 hours at 70° C, using a reflux tube. Thereafter it was diluted with 101.5 ml of water and swiftly evaporated in vacuo to a dry content of 39.4%. The resulting glue 1068 Asv showed a density of 1.21, and a viscosity (Ford cup no 2) of 19 cP at 20° C. After standing 4 days at room temperature the viscosity was still 19 cP.

Phenol adhesive: 30 g of phenol, 28.5 g of 4 molar sodium hydroxide solution and 48.8 ml of 35% formalin were mixed and heated 3 hours at 90° C, using a reflux tube. 32.1 ml of water were then added. The calculated dry content was thereafter 36.0%, and the amount of phenol used 20.3% of the weight of the adhesive (1,068 B fen). Density 1.10, viscosity of a fresh sample 27.0 cP, after 4 days at room temperature still 27.0 cP.

177.9 g of the black liquor adhesive 1068 Asv and 54.6 g of the phenol adhesive 1,068 B fen were mixed, whereby the amount of phenol used was 19.1% of the sum of the phenol and the organic matter from the black liquor. To this mixture 5.3 ml of 35% formalin were added. The thus obtained mixed adhesive 1068 AB form, dry content 38.5%, $d = 1.18$, viscosity for fresh adhesive 24.9 cP, after 24 hours at room temperature 27.0 cP.

To 5 g of the mixed adhesive 1068 AB form 6 drops = 0.22 ml of 12 N sulfuric acid were added, and also 1.2 g of an additive mixture "K", containing 42% Vavanite Powder, 21% quebracho extractive, 10.5% of wheat flour and 26.5% of chalk (calcium carbonate), all of them in a finely divided state. The pH was then 9.4, measured potentiometrically in a sample diluted 1:10 with distilled water. The mixed adhesive does not give any reaction for hydrogen sulfide on lead acetate paper after acidification with hydrochloric acid 1:3 and slight heating. Sulfide ions, $S^{--}$ and $SH^-$, are thus absent.

Glueing of plywood by heating of a 3 sheet test sample, in all 4 mm thick, 6 minutes at 145° C resulted in strength on air dried plywood $^{xx}112^{-xx}124$ kg per square inch (25 × 25 mm).

After standing over night in a vessel with water on the bottom: moisture the increase of the plywood was 4.3 and 4.7% respectively, strength $^{xx}176$ $^{x}152$ kg per square inch. The crosses mean that one or both of the glued joints in the test sample were resistant against loosening by hand. In the case of the samples which had been standing in moist air, the kg value as well as the loosening testings were made after the samples had been immersed in water 18–20 hours at room temperature. Underlined numbers mean that the wood was entirely broken, but not the glue; underlined with a broken line means that the wood and the glue both of them were in part broken. Number of crosses: 7 of 8 possibles.

EXAMPLE 2

The black liquor adhesive 1,070 C sv was prepared analogously to 1,068 Asv (example 1) from 243.3 g black liquor and 38.7 ml of 35% formalin by heating 3 hours at 70° C and addition of 64.1 ml of water. Dry content thereafter 39.9%, $d = 1.23$. No evaporation in vacuo was used.

The phenol adhesive 1,070 B fen was prepared analogously to 1068 B fen in example 1.

212 g of the black liquor adhesive 1,070 C sv were mixed with 69.6 g of the phenol adhesive 1,070 B fen and 33.9 ml of 35% formalin. In the resulting mixed adhesive 1,070 BC form the amount of phenol used was 20.1% of the sum of phenol and organic matter of the black liquor. The dry content was 38.5% density 1.18, viscosity at room temperature for a fresh sample (Ford cup no 2) 37.7 cP, after 11 days at room temperature 273 cP. Testing for hydrogen sulfide on lead acetate paper (see example 1) was negative.

To 5 g of this mixture 10 drops = 0.20 ml of 9.5 N lactic acid and 1.2 g of the additive mixture K were added. The pH after dilution 1:10 was 8.95. Glueing 6 min. at 145° C, as in example 1: on air dry birch plywood $^{xx}112$, $^{xx}112$ kgs. per square inch, moisture increase 4.2; 4.2%, strength $^{xx}140$, $^{x}171$ kg/sq. inch. 7 crosses of 8 possible.

EXAMPLE 3

5.8 g of phenol, 6.15 ml 4 N sodium hydroxide solution, 8.45 ml 35% formalin and 6.1 ml of water were heated 3 hours at 90° C. The obtained phenol adhesive had a dry content of 35.6% and the amount of phenol used was 20.6% of its weight. Then 58.3 g of kraft black liquor with a dry content of 55.2% and a content of organic matter of 38.6%, obtained from a digestion of wood of birch (Betula alba L.), were added, and further 9.3 ml of 35% formalin. The mixture was heated 3 hours at 70° C, and 21 ml of water were added. The resulting birch black liquor adhesive L 3,319 b had a dry content of 38.9% and the amount of phenol used was 20.5% of the sum of the phenol and the organic matter of the black liquor. The viscosity of the fresh adhesive was 30 cP, after 24 hours at room temperature 35 and after in all 4 ¾ days 40 cP. To 5 g of the mixture 0.22ml of 16.6 molar acetic acid and 1.2 g of the additive mixture K (example 1) were added. The pH, determined as in example 1, was 8.6. Glueing 6 min. at 145° C. strength on air dry birch plywood $^{xx}84$ $^{xx}90$ kg/sq. inch. Addition of moisture 4.7; 5.5%, strength $^{xx}95$, $^{xx}141$ kg/sq. inch. 8 crosses of 8 possible.

EXAMPLE 4

It was carried out like example 3, but instead of 0.22 ml of 16.6 molar acetic acid 0.22 ml of 12 molar sulfuric acid were added. The pH value was then 7.5. Glueing 6 min. at 150° C on air dry birch plywood: strength $^{x}88$, $^{xx}112$ kg. Increase of moisture 5.3; 5.3%, strength thereafter $^{xx}143$, $^{xx}121$ kg/sq. inch. 7 crosses of 8 possible.

EXAMPLE 5

L 3301, 23 and 24. Black liquor adhesive: To 78 g of the same softwood kraft black liquor which was used in example 1, 12.5 ml of 35% formalin were added. The mixture was heated 4.5 hours at 70° C. 32.5 ml of water were added. The dry content was then 36.0% and the viscosity of the fresh adhesive 30.7 cP, after standing 5 days at room temperature 36.6 cP, after further 3 days 40.7 cp, and after still 12 days 77.9 cP.

Phenol adhesive: 57.0 g of phenol, 53.5 ml of 4 molar sodium hydroxide solution and 78.0 ml of 35 % formalin were heated for 4 hours and 40 minutes at 90° C. 60 ml of water were added. The dry content was then about 36.2 %. The viscosity was after standing 23 days at room temperature 146 cP.

4 g of the black liquor adhesive and 1 g of the phenol adhesive were mixed. The dry content of the obtained mixture was 36.0 % and the amount of phenol used was 18.1 % of the sum of the phenol and the organic matter of the black liquor. To the mixture 0.22 ml of 16.6 molar acetic acid, 1.4 g of additive combination K (example 1) and 0.2 g of paraformaldehyde were added. The pH value, measured after dilution 1:10 was 7.4. Glueing 7 min. at 145° C: strength on glued, air dry birch plywood $^{xx}$100, $^{xx}$134 kg/sq. inch. Moisture increase 5.1; 5.3 %. Strength thereafter $^{xx}$153$^{xx}$193 kg/sq. inch. 8 crosses of 8 possible.

EXAMPLE 6

The experiment was carried out like experiment 5, including addition of 0.22 ml 16.6 molar acetic acid, 1.4 g of "K" and 0.2 g of paraformaldehyde. The only difference was that the black liquor adhesive was heated at 70° for 3 hours only. The viscosity of the black liquor adhesive before mixing was for a fresh sample 21.8 cP, after 5 days at room temperature 24.0, after further 8 days 28.0, and 7 days later 36.6 cP. The pH of the mixed adhesive after dilution 1:10 was 7.4. Glueing 7 x min. at 145° C: strength for air dry birch plywood $^{xx}$72,$^{xx}$138 kg/sq. inch, moisture increase 4.8; 5.3 %, strength after that $^{xx}$121, $^{xx}$161 kg/sq. inch. 8 crosses of 8 possible.

EXAMPLE 7

120 g of phenol, 112.4 ml of 4 molar sodium hydroxide solution, and 165.6 ml of 35 % formalin were heated for 2 hours and 55 minutes at 87° C using a reflux cooler. The viscosity of the obtained phenol adhesive Bj 796 was after that 180 cP. It had a dry content of 46.9 % and the amount of phenol used was 28.1 % of the weight of the adhesive.

125.7 g of the phenol adhesive Bj 796,208 g of a softwood kraft black liquor of similar origin as the black liquor in example 1, but with a dry content of 53.0 % and a content of organic matter of 39.7 %, and 35.6 ml of 35 % formalin were heated 1 hour and 30 min. at 70° using a reflux cooler. The viscosity of the obtained adhesive Bj 798 was then 162 cP. This adhesive had a dry content of 49.1 % and the amount of phenol used was 30 % of the sum of phenol and organic matter of the used kraft black liquor.

To 5 g of the adhesive Bj 798 were added 1.2 g of a mixture of additives containing 0.64 g Vavanite powder, 0.40 g chalk (calcium carbonate), and 0.16 g of wheat flour — thus without quebracho extractives — and further 1.2 ml of 3.9 N sulfuric acid. The calculated dry content, without the mixture of additives and taking into account only the water in the 3.9 N sulfuric acid, would be 40.0 %. The pH-value, measured as in example 1, was 10.3. Glueing 6 minutes at 150° at a pressure of 17 kg/cm$^2$: strength on 3 samples of glued, air dry birch plywood $^{xx}$154, $^{xx}$156, $^{xx}$156 kg/sq. inch. Moisture increase 5.0; 5.0; 5.2 %, strength of moistened, glued and then water treated plywood >$^{xx}$181, >$^{xx}$195, >$^{xx}$166 kg/sq. inch. Number of crosses 12 of 12 possible.

EXAMPLE 8

This example is like example 7, with the exception that the added 1.2 ml of sulfuric acid was 4.5 N, and that the added 1.2 g of additives contained 0.3 g of flour of pine bark and 0.9 g of a mixture of Vavanite powder, calcium carbonate and wheat flour which was used at example 7. The pH value of the adhesive with additives and measured in the same way as in example 1 was 9.9. Glueing 6 minutes at 150° at a pressure of 17 kg/cm$^2$: strength on 3 samples of glued, air dry birch plywood $^{xx}$152, $^{xx}$147, $^{xx}$140 kg/sq. inch. Uptake of moisture 5.7 %, strength after treatment with water at room temperature $^{xx}$165, $^{xx}$167, $^{xx}$154 kg./sq. inch. 12 crosses of 12 possible.

EXAMPLE 9

28.2 g of phenol, 26.1 ml 4 molar sodium hydroxide solution and 38.9 ml of 35 % formalin were introduced in a flask in a water bath at room temperature. The water bath was heated to 90° and the adhesive mixture, provided with a reflux cooler, was kept at that temperature for 5 hours. The viscosity of the thus obtained phenol adhesive 3,387 f was 1064 cP. It had a dry content of 47.0 % and the amount of phenol used was 28.2 % of the weight of the adhesive.

26.5 g of the phenol adhesive 3,387 f and 58.3 g of a kraft black liquor obtained at digestion of a mixture of about 65 % of birch (*Betula alba L.*) and 35 % of softwood (pine, *Pinus sylvestris L.*) and spruce (*Picea abies L.*), slightly oxidized with air and having a dry content of 51.8 % and a content of 39 % of organic matter, were heated together with 10.2 ml of 35 % formalin and 14.2 ml of water for 1 hour 30 min. at 70° C. The thus obtained adhesive 3,391 b had a viscosity of 37 cP at room temperature and a dry content of 42.3 %. The amount of phenol used was 20.3 % of the sum of the phenol and the organic matter of the black liquor.

To 5 g of the adhesive 3,391 b were added 1.2 g of the mixture K of Vavanite powder etc., as in example 1, and 0.35 ml of 12 N sulfuric acid. The pH value, measured as in example 1, was 9.15. Glueing 6 min. at 145° C at a pressure of 17 kg/cm$^2$: strength on 2 samples of glued, air dried birch plywood $^{xx}$116, $^{xx}$154 kg/sq. inch. Moisture increase 9.6; 8.5 %, strength after treatment with water at room temperature $^{xx}$194; >$^{xx}$200 kg/sq. inch. 8 crosses of 8 possible.

While the invention has been described and illustrated by way of preferred embodiments thereof, it will be apparent to those skilled in the art that variations and modifications may be made without departing from the scope of the present invention as defined by the appended claims.

What I claim is:

1. A process for preparing an adhesive based on black liquor from the pulping industry having a dry matter content of more than 25%, comprising reacting the black liquor with a formaldehyde or cresol to form an adhesive and combining it with a separately prepared phenol-formaldehyde or cresol-formaldehyde adhesive in proportions such that the amount of phenol or cresol used is 15-50% of the sum of the phenol or cresol used and the organic matter of the black liquor.

2. A procedure according to claim 1 wherein the black liquor and additional formaldehyde or cresol are added to the phenol-formaldehyde or cresol formaldehyde adhesive and heated in the same vessel.

3. A procedure according to claim 1 wherein the value of pH is between 7 and 11, measured after dilution of 1 part by weight of adhesive with 10 parts of weight of pure water.

4. A procedure according to claim 1 wherein an amount of formalin or paraformaldehyde of 2-15 % calculated as formaldehyde on the total organic matter of the adhesive is added after the heating of the adhesive reaction mixture.

* * * * *

UNITED STATES PATENT OFFICE
CERTIFICATE OF CORRECTION

PATENT NO. : 3,864,291
DATED : February 4, 1975
INVENTOR(S) : Terje Ulf Eugen Enkvist It is certified that error appears in the above-identified patent and that said Letters Patent are hereby corrected as shown below:

Column 3, line 58, "112" should be --$\underline{112}$--;
line 63, "176" and "152" should be --$\underline{176}$-- and --$\underline{152}$--;
Column 4, line 32, the second "112" should be --$\underline{112}$--;
line 33, "140" and "171" should be --$\underline{140}$-- and --$\underline{171}$--;
line 57, "95" should be --$\underline{95}$--;
line 58, "141" should be --$\underline{141}$--;
line 66, "88" and "121" should be --$\underline{88}$-- and --$\underline{112}$--;
line 67, "143" and "121" should be --$\underline{143}$-- and --$\underline{121}$--;

Column 5, line 26, "100" should be --$\underline{100}$--;
line 27, "153" should be --$\underline{153}$--;
line 41, "138" should be --$\underline{138}$--;

UNITED STATES PATENT OFFICE
CERTIFICATE OF CORRECTION

Patent No. 3,864,291  Dated February 4, 1975

Inventor(s) Terje Ulf Eugen Enkvist   Page 2

It is certified that error appears in the above-identified patent and that said Letters Patent are hereby corrected as shown below:

Column 6, line 56, "154" should be --$\underline{1}5\underline{4}$--;
line 58, "194" should be --$\underline{1}9\underline{4}$--.

Signed and sealed this 1st day of July 1975.

(SEAL)
Attest:

RUTH C. MASON
Attesting Officer

C. MARSHALL DANN
Commissioner of Patents
and Trademarks